United States Patent [19]

Chutko et al.

[11] Patent Number: 5,972,432
[45] Date of Patent: Oct. 26, 1999

[54] AQUEOUS COATING COMPOSITION

[75] Inventors: Mary Jo Chutko, Beaver Falls; Phillip C. Martino, Gibsonia, both of Pa.

[73] Assignee: Valspar Corporation, Pittsburgh, Pa.

[21] Appl. No.: 08/809,916

[22] PCT Filed: Oct. 3, 1995

[86] PCT No.: PCT/US95/13223

§ 371 Date: Jul. 14, 1997

§ 102(e) Date: Jul. 14, 1997

[87] PCT Pub. No.: WO95/10612

PCT Pub. Date: Apr. 11, 1996

Related U.S. Application Data

[63] Continuation-in-part of application No. 08/317,384, Oct. 4, 1994, Pat. No. 5,527,840.

[51] Int. Cl.⁶ ........................................................ B05D 3/20
[52] U.S. Cl. .................... 427/386; 427/388.3; 427/388.4; 428/418; 523/412
[58] Field of Search ............................. 523/412; 427/386, 427/388.3, 388.4; 428/418

[56] References Cited

U.S. PATENT DOCUMENTS

| | | |
|---|---|---|
| 3,943,187 | 3/1976 | Wu . |
| 4,021,396 | 5/1977 | Wu . |
| 4,247,439 | 1/1981 | Matthews et al. . |
| 4,302,373 | 11/1981 | Steinmetz . |
| 4,303,488 | 12/1981 | Seiler et al. . |
| 4,303,565 | 12/1981 | Tobias ....................................... 523/412 |
| 4,393,119 | 7/1983 | Concannon . |
| 4,423,165 | 12/1983 | Harper et al. . |
| 4,425,451 | 1/1984 | Sekmakas et al. . |
| 4,442,246 | 4/1984 | Brown et al. . |
| 4,444,923 | 4/1984 | McCarthy . |
| 4,446,258 | 5/1984 | Chu et al. .................................. 523/412 |
| 4,446,260 | 5/1984 | Woods et al. . |
| 4,476,262 | 10/1984 | Chu et al. . |
| 4,480,058 | 10/1984 | Ting et al. . |
| 4,482,673 | 11/1984 | Brown et al. . |
| 4,487,860 | 12/1984 | Winner et al. . |
| 4,547,535 | 10/1985 | Brown et al. . |
| 4,585,813 | 4/1986 | Brown et al. . |
| 4,598,109 | 7/1986 | Sekmakas et al. . |
| 4,623,680 | 11/1986 | Azarnia et al. . |
| 4,751,256 | 6/1988 | Patel et al. . |
| 4,957,952 | 9/1990 | Sekmakas et al. . |
| 4,963,602 | 10/1990 | Patel . |
| 5,110,847 | 5/1992 | Kojima et al. . |
| 5,264,469 | 11/1993 | Mysliwczyk . |
| 5,296,525 | 3/1994 | Spencer . |

OTHER PUBLICATIONS

Material Safety Data Sheet for Varcum 29–116.
Letter from Occidental Chemical regarding capillary melt point for Varcum 29–116.
Viscosity Conversion Chart (from Apr. 1973 issue of Design News).

*Primary Examiner*—Melvyn I. Marquis
*Assistant Examiner*—D. Aylward
*Attorney, Agent, or Firm*—Merchant & Gould P.C.

[57] ABSTRACT

An aqueous coating composition and a method of coating a metal substrate are provided. The composition and method are particularly suitable for use in coating can bodies and can ends or for can side seam coatings. The coating composition includes a solvent component and a film forming component. The solvent component includes water and an organic solvent. The film forming component includes a curing agent and the product of the reaction of a carboxy addition polymer and an epoxy resin in the presence of a tertiary amine catalyst.

20 Claims, No Drawings

AQUEOUS COATING COMPOSITION

CROSS-REFERENCE TO RELATED APPLICATIONS

This application is a 371 of PCT/US 95/13223 filed Oct. 3, 1995, and a continuation-in-part application of U.S. Ser. No. 08/317,384 filed Oct. 4, 1994, which issued as U.S. Pat. No. 5,527,840 on Jun. 18,1996.

BACKGROUND OF THE INVENTION

Coatings are applied to the interior of metal food and beverage cans to prevent the contents from coming into contact with the metal surfaces of the containers. Contact of the can contents with the metal surface, especially where acidic products such as soft drinks, tomato juice or beer are involved, can lead to corrosion of the metal container and resulting contamination and deterioration of the contents. Can interiors are typically coated with a thin thermoset film to protect the interior metal surface from its contents. Synthetic resin compositions which include vinyls, polybutadiene, epoxy resins, alkyd/aminoplast and oleoresinous materials have typically been utilized as interior can coatings. These heat-curable resin compositions are usually applied as solutions or dispersions in volatile organic solvents.

The ideal coating should have low extractables to avoid contamination of the contents and should cure rapidly to facilitate can manufacture. The cured coating should be highly resistant to a wide variety of food products, both under storage and processing conditions. The interior coating should be substantially free of blisters and should have good adhesion to the metal surface, both on application and after processing.

Relatively thick films are required to ensure complete coverage of the metal and to protect the metal during drawing and forming operations. This is especially true of coatings applied to metal substrates used to produce the end of a can, where film weights of about 5 to about 9 mg/in$^2$ are typically required. Side seam coatings, which are also applied as thick films and require blister resistant coatings, have similar performance characteristics. The coatings used for food cans and can ends are generally applied and cured into films on high speed coating lines (e.g., coil coating lines). Modern high speed coating lines require a coating material that will dry and cure without defects within a few seconds as it is heated very rapidly to peak metal temperatures of about 450° F. to about 550° F. (about 230° C. to about 300° C.).

Due to the rapid curing speeds involved, attempts to utilize aqueous coatings on modern coil coating lines have encountered particularly difficult problems in avoiding blistering. Blistering typically occurs as cure temperature passes through the boiling point of water. Blistering becomes more acute as the thickness of the uncured coating layer increases and at higher heating rates and higher peak metal temperatures. All of these factors may be present during application of a coating to can ends on a high speed coating line.

Compositions in which the film producing material is dispersed or dissolved in organic solvents are generally used in coating applications where a relatively thick coating is required. Due to environmental and economic drawbacks associated with the use of organic solvents, however, there is an increasing demand for aqueous-based coatings. In addition to being less expensive than organic solvent-based coatings, aqueous-based coatings minimize the environmental impact of organic solvent release and diminish the need to incinerate curing oven effluents. Unfortunately, under rapid, high temperature curing conditions, currently available aqueous-based coatings do not provide satisfactory performance. There is, accordingly, a continuing need for aqueous-based coatings, which will permit the formation under rapid, high temperature curing conditions of protective films which are substantially free of blisters.

SUMMARY OF THE INVENTION

The present invention provides an aqueous coating composition capable of forming a tough coating, resistant to hydrolysis and other forms of chemical attack, while minimizing environmental problems associated with the use of organic solvents. The coating composition can be applied and cured without blistering at high coating weights and high line speeds to provide a resilient, corrosion resistant, cured film. In addition to the choice of specific components, achievement of these properties is dependent on a proper balance of the solids content, viscosity and water content of the coating composition.

The coating composition includes a solvent component and a film forming component. The solvent component includes water and an organic solvent. The film forming component includes a curing agent and the product of the reaction of a carboxy addition polymer and an epoxy resin in the presence of a tertiary amine catalyst.

The present invention also provides a method of coating a metal substrate to provide a cured film on at least one surface of the substrate. The method includes applying the aqueous coating composition onto the surface of the metal substrate to form a coating layer. The coated metal substrate is then heated so that the coating layer cures to form a cured film adhered to the substrate surface. The coated metal substrate is typically cured by heating for about 2 to about 20 seconds in an oven at a temperature of about 230 to about 300° C. The cured film is substantially free of blisters and typically has a film weight of at least about 5 mg/in$^2$ and, preferably, about 7 mg/in$^2$ to about 9 mg/in$^2$.

The present invention also provides a composite material which includes a metal substrate having at least one surface covered with a cured film, which is the result of coating the substrate surface with the above-described coating composition and heating the coated metal substrate for 2 to 20 seconds at a temperature of 230 to 300° C. The cured film preferably has a film weight of at least about 5 mg/in$^2$.

DETAILED DESCRIPTION OF THE INVENTION

Coating compositions of this invention are useful for protecting the interior of food and beverage cans. The cans are typically formed from metals such as aluminum, tin, steel or tin-plated steel. The coatings are generally applied to metal sheets by one of two processes, each of which involves different coating and curing conditions. The coated metal sheets may be fabricated into can bodies or ends in a later stage of the manufacturing operation. One process, called the sheet bake process, involves roll coating large metal sheets. These sheets are then placed up-right in racks and the racks are typically placed in ovens for about 10 minutes to achieve peak metal temperatures of about 180° C. to about 205° C. In a coil coating process, the second type of process, large rolls of thin gage metal (e.g., steel or aluminum) are unwound, roll coated, heat cured and rewound. During the coil coating process, the total residence time in the curing ovens will vary from about 2 seconds to about 20 seconds with peak metal temperatures typically reaching about 230° C. to about 300° C.

The aqueous coating composition of the present invention is particularly suitable for use in coating the ends or closures of food and beverage cans or for can side seam coatings. Can ends are typically roll coated on coil coating lines to a dry film weight (after curing) of at least about 5 mg/in$^2$, preferably about 7 to about 9 mg/in$^2$, and most preferably about 7.5 to about 8.5 mg/in$^2$. The present coating composition may also be used to coat the interior of the can body, where it typically is applied via a sheet bake process.

The present aqueous coating composition can be coated onto a metal substrate at a relatively high film weight (e.g., 5 to 9 mg/in$^2$). The integrity and thickness of the uncured film can be sustained despite the exposure of the coated substrate to translational forces (e.g., the translational forces generated during the coating of large rolls of thin gage metal on high speed coil coating lines). The coated substrate can then be cured at high coating weights and high line speeds without forming blisters. Use of the present coating composition permits formation of a tough, resilient cured film which is substantially free of defects. Another advantage of the present aqueous coating composition is that, despite differences in performance requirements between the two processes, the same composition used to form a relatively thick coating via a coil coating process may also be employed to form thinner coatings (e.g., a film weight of 3–4 mg/in$^2$) through a sheet bake process. This avoids the need to develop separate formulations to address the differing requirements of the two application methods.

The aqueous coating composition includes at least about 50 wt.% and, preferably, at least about 55 wt.% of a solvent component and at least about 30 wt.% of a film forming component (based on total weight of the coating composition). The aqueous coating composition preferably has sufficient viscosity and solids content to permit application at a relatively high film weight (e.g., 5 to 9 mg/in$^2$) on a metal substrate subjected to translational forces, such as the forces generated during a coil coating process. Viscosity of the coating composition should also be low enough to avoid blistering during cure of the coated substrate. Preferably, viscosity of the coating composition is about 13 to about 100 seconds, more preferably about 20 to about 80 seconds and most preferably about 30 to about 60 seconds (#4 Ford cup at 80° F. (27° C.)). Where the coating composition is to be applied through a coil coating process, the composition preferably includes at least about 30 wt.% and, more preferably, about 35 to about 45 wt.% of film forming component and typically has a viscosity of about 30 to about 60 seconds (#4 Ford cup at 80° F). For those applications where a sheet bake process is to be utilized and relatively low coating weight (e.g., 3–4 mg/in$^2$) are desired, the composition preferably includes about 35 to about 45 wt.% of film forming component and typically has a viscosity of about 50 to about 80 seconds (#4 Ford cup at 80° F.).

The coating composition is in the form of an aqueous dispersion with the film forming component substantially present in the form of particles. If particle size is too large, stability problems may be experienced with the dispersion. Typical particle size is about 0.1 to about 0.6 micron, preferably about 0.2 to about 0.4 micron and, most preferably, no more than 0.35 micron. The pH of the coating composition is preferably within the range of about 6.0 to about 8.0 and more preferably is about 6.5 to about 7.5.

The solvent component includes water and an organic solvent. Preferably, the solvent component includes about 70 to about 97 wt.%, more preferably about 75 to about 95 wt.% water and most preferably about 79 to about 91 wt.% water (based on the total weight of the solvent component). In order to minimize cost and environmental problems, it is desirable to include as high a percentage of water as possible. Some organic solvent is necessary, however, to prevent formation of blisters during curing, particularly where the coating is applied on a high speed coil coating line. The solvent component typically includes at least about 3 wt.%, preferably at least about 5 wt.% and more preferably at least about 8 wt.% organic solvent (based on total weight of the solvent component).

Preferably the organic solvent is substantially miscible with water and is either in the form of a singular polar compound or as a mixture of compounds which may include non-polar components. The solvent typically is capable of dissolving the resins in the film-forming component, thereby facilitating their dispersion in an aqueous solution. Suitable solvents, to be used either alone or as part of a mixture, include glycol ethers and alcohols such as alkanols, monoalkyl glycols, and alkyl carbitols (diethylene glycol monoalkyl ethers). Among the most commonly used solvents are alcohols such as butyl alcohols (e.g., n-butanol), 2-butoxyethanol, Butyl Carbitol (diethylene glycol monobutyl ether). Non-polar solvents may also be included as minor constituents of the organic solvent. Suitable non-polar solvents which may be used include: aliphatic and aromatic hydrocarbons, such as naphtha, heptane, mineral spirits, toluene and the like.

The film forming component includes a carboxy addition polymer and an epoxy resin, which have been reacted together in the presence of a tertiary amine catalyst. A curing agent is then blended with the resulting reaction product. The amounts (wt.%) specified for the carboxy addition polymer, the epoxy resin and the curing agent are expressed as a wt.% based on the total weight of the film forming component (i.e., the solids content of the coating composition).

The resin mixture includes at least about 7 wt.%, preferably about 10 to about 40 wt.% of the carboxy addition polymer. Most preferably, the resin mixture includes at least about 15 to about 25 wt.% of the carboxy addition polymer. The carboxy addition polymer may be prepared by conventional polymerization processes and is preferably a copolymer of at least one polymerizable, ethylenically unsaturated carboxylic acid monomer and at least one copolymerizable nonionic monomer. Suitable ethylenically unsaturated carboxylic acid monomers include acrylic, methacrylic, maleic, fumaric and itaconic acids. The ethylenically unsaturated carboxylic acid monomer is preferably an α,β-unsaturated carboxylic acid having from 3 to 10 and, more preferably, from 3 to 5 carbon atoms. Acrylic acid and methacrylic acid are particularly preferred. Suitable copolymerizable nonionic monomers include nonionic ethylenically unsaturated monomers, such as vinyl aromatic compounds and alkyl esters of ethylenically unsaturated carboxylic acids. Included among the most commonly used copolymerizable nonionic monomers are lower alkyl acrylates (e.g., ethyl acrylate), lower alkyl methacrylates, styrene, alkyl-substituted styrenes, vinyl acetate and acrylonitrile. Preferably, the copolymerizable nonionic monomer is selected from the group consisting of styrene and $C_1$ to $C_6$ alkyl esters of α,β-unsaturated carboxylic acids having 3 to 5 carbon atoms.

The weight average molecular weight of the carboxy addition polymer is generally at least about 2,000 and typically does not exceed about 60,000. More preferably, the weight average molecular weight of the addition polymer is about 5,000 to about 25,000 and most preferably, about 7,000 to about 15,000. The carboxy addition polymer has an acid number of at least about 165, typically about 200 to about 350, and preferably about 225 to about 325. The acid number is defined as the amount of potassium hydroxide (in mg) required to neutralize one gram of polymer (on a solids basis). Typically, the carboxy addition polymer has a glass transition temperature ($T_g$) of no more than about 110° C. and, preferably, the glass transition temperature of the carboxy addition polymer is about 50 to about 100° C. If the coating composition includes a relatively large amount of epoxy resin (e.g., at least about 60 wt.% based on the total weight of the film forming component), a carboxy addition polymer having a relatively low $T_g$, i.e., about 50 to about 100° C., is typically employed.

The resin mixture also includes at least about 40 wt., and preferably about 50 to about 90 wt.% of the epoxy resin (based on the total weight of the film forming component). Most preferably, the resin mixture includes about 60 to about 80 wt.% of the epoxy resin. The epoxy resin may be any organic solvent-soluble resin containing epoxy groups. Preferably, the epoxy resin includes glycidyl polyethers having more than one epoxide group per molecule (i.e., glycidyl polyethers containing an average of greater than 1.0 epoxy groups per molecule). Typically, the glycidyl polyethers have an average of about 2.0 to about 2.5 epoxide groups per molecule. Diglycidyl ethers of dihydric phenols are particularly suitable for use in the present coating composition. Exemplary dihydric phenols include resorcinol, 1,5-dihydroxy naphthalene and bisphenols, such as Bisphenol A (p,p'-dihydroxy-2,2-diphenyl propane). Bisphenol A is the preferred dihydric phenol. The epoxy resins typically used in the present invention may be derived from the reaction of the dihydric phenol and an epihalohydrin, such as epichlorohydrin. Molecular weight of the initial reaction product may be increased by reaction with additional dihydric phenol. Epoxy resins suitable for use in the present invention typically have epoxide equivalent weights of at least about 1,000 and no more than about 30,000. The upper limit for the epoxide equivalent weight of the epoxy resin is dictated primarily by the viscosity of the resin that can be accomodated by the processing equipment employed to prepare the coating composition. Epoxy resins having an epoxide equivalent weight of greater than about 30,000 are generally more viscous than can be handled by conventional processing equipment. The epoxide equivalent weight is preferably about 1,500 to about 10,000. Diglycidyl ethers of Bisphenol A are commonly available in commerce and commercial materials such as Epon 1009F and Epon 1007F (both available from Shell Chemical Company, Houston, Tex.) are suitable for use in the present invention. Most preferably, the epoxy resin includes a diglycidyl ether of Bisphenol A having an epoxide equivalent weight of about 2,500 to about 8,000.

The epoxy resin may include diglycidyl ethers of dihydric phenols whose molecular weight has been increased ("upgraded") by reaction with additional dihydric phenol or with a diacid. The inclusion of a higher molecular weight epoxy resin improves the flexibility of the coating composition and, in particular, improves the resistance of the coating to crazing during fabrication. It has been found that incorporation of an epoxy resin which has been upgraded by reaction with an aliphatic diacid may lower the viscosity of the epoxy resin as well as improve the flexibility of the coating ultimately formed from the coating composition. Suitable aliphatic diacids which may be employed to upgrade the epoxide equivalent weight of the epoxy resin include adipic acid, succinic acid, dimer fatty acid and the like. For example, the epoxy resin may include a diglycidyl ether of Bisphenol A which has been upgraded to an epoxide equivalent weight of about 2,500 to about 8,000 by reaction with an aliphatic diacid such as adipic acid. The weight of diacid employed in the upgrade will depend on a number of factors, such as the molecular weight of the diacid, the epoxide equivalent weight of the starting epoxy resin and the desired epoxide equivalent weight for the epoxy resin. Typically, the amount of diacid used to upgrade the epoxy resin ranges from about 0.5 to about 20 wt.% and, preferably, from about 1.0 to about 15 wt.% of the epoxy resin component.

The epoxy resin may also be partially defunctionalized by reaction with a phosphorus-containing acid or with an organic monoacid. The phosphorus-containing acid is an acid having a P—OH functionality or an acid that is capable of generating such a functionality upon reaction with water (e.g., a compound having a P—O—P functionality). Examples of suitable phosphorus-containing acids include polyphosphoric acid, superphosphoric acid, aqueous phosphoric acid, aqueous phosphorous acid and partial alkyl esters thereof. The organic monoacid is preferably an aromatic carboxylic acid having up to ten carbon atoms or a $C_1$ to $C_{20}$ alkanoic acid. Examples of suitable organic monoacids include acetic, benzoic, stearic, palmitic and octanoic acids. The epoxy resin is typically defunctionalized by reacting from up to about 50% of the epoxy groups present with the organic monoacid. Where the epoxy resin is defunctionalized by reaction with the phosphorus-containing acid, up to about 50% of the epoxy groups are typically reacted with the acid.

The reaction between the carboxy addition polymer and the epoxy resin is carried out in the presence of about 0.35 to about 1.0 equivalents and, more preferably, about 0.5 to about 0.8 equivalents, of a tertiary amine catalyst per equivalent of carboxy groups present in the carboxy addition polymer. Examples of suitable tertiary amines include trialkyl amines (e.g., diethylbutyl amine), dialkyl benzyl amines, and cyclic amines such as N-alkyl pyrrolidine, N-alkyl morpholine and N,N'-dialkyl piperidine. Tertiary amines containing at least two methyl groups, such as dimethyl ethanolamine, trimethylamine and dimethylbenzyl amine, are preferred.

The film forming component includes at least about 2 wt.% curing agent (based on the total weight of the film forming component). More preferably, the film forming component includes about 3 to about 45 wt.%, and most preferably, about 5 to about 25 wt.% of the curing agent. The curing agent includes an aminoplast resin and/or a phenoplast resin.

Preferably, the curing agent includes a phenoplast resin. Phenoplast resins are condensation products of an aldehyde, such as formaldehyde or acetaldehyde, and a phenol. Suitable phenoplast resins may be derived from an unsubstituted phenol, cresol or other alkyl phenols as well as from dihydric phenols such as Bisphenol A. Mixtures of phenols may be used to vary and control properties of the phenoplast resin. The phenoplast resin preferably includes at least one of an alkylated phenol-formaldehyde resin and a bisphenol A-formaldehyde resin. The melting point of the phenoplast resin is preferably no more than about 100° C. Alkylated phenol-formaldehyde resins which are suitable for use in the present coating compositions include polymeric, solid resins having low color and a molecular weight of at least 1000. Such alkylated phenol-formaldehyde resins are typically based on one or more longer chain alkylated phenols, e.g., phenols substituted with an alkyl group having from 4 to 10 carbon atoms. Representative longer chain alkylated phenols include t-butylphenol, hexylphenol, octylphenol, t-octylphenol, nonylphenol, decylphenol and dodecylphenol.

The film forming component may also include a hydrophobic addition polymer. The incorporation of a hydrophobic addition polymer as an additional component in the present coating compositions may lead to an enhancement in the flexibility, adhesion and/or water resistance of coatings derived from the composition. When present, the amount of the hydrophobic addition polymer added to the coating composition typically ranges from about 5 to about 35 wt.% and preferably from about 10 to about 30 wt.% of the film forming component ("solids content").

The hydrophobic addition polymer has a relatively high molecular weight and is typically formed by the polymerization of one or more nonionic monomers (i.e., monomers which do not include an ionizable functional group such as a carboxylic acid or an amine). The weight average molecular weight of the hydrophobic addition polymer is typically at least about 50,000 and preferably at least about 100,000. Polymers of this type may be produced by an emulsion polymerization process. The preparation of addition polymers of this type is disclosed in U.S. Pat. Nos. 4,446,258 and 4,476,262, the disclosure of which is herein incorporated by reference. Preferably, the hydrophobic addition polymer is formed in situ by emulsion polymerizing one or more ethylenically unsaturated nonionic monomers in the presence of an aqueous dispersion of the carboxy addition polymer/epoxy resin reaction product.

The hydrophobic addition polymer is preferably formed from a monomer or monomers which do not include a hydrophilic group, such as a hydroxyl group or an ionizable group. Examples of suitable hydrophobic monomers include hydrophobic ethylenically unsaturated monomers such as vinyl aromatic compounds or alkyl acrylate and methacrylate esters. In a preferred embodiment of the invention, the hydrophobic addition polymer is formed via emulsion polymerization of a mixture of styrene and butyl acrylate.

The present hydrophobic addition polymer typically has a relatively low $T_g$, e.g., a $T_g$ of no more than about 100° C. Preferably, the present hydrophobic addition polymer has a Tg of no more than about 40° C., and more preferably no more than about 20° C. Hydrophobic addition polymers which are in a rubbery state at ambient temperatures are highly effective for use in the present coating compositions. One example of a suitable hydrophobic addition polymer which may be employed in the present coating composition is a polymer formed from a 1:1 mixture of styrene and butyl acrylate and having a calculated $T_g$ of 30° C.

Depending upon the desired application, the coating composition may include other additives such as lubricants, coalescing solvents, leveling agents, wetting agents, thickening agents, suspending agents, surfactants, defoamers, adhesion promoters, corrosion inhibitors, pigments and the like. Coating compositions, which are to be used as a can coating, typically include a lubricant such as a hard, brittle synthetic long-chain aliphatic wax, a carnuba wax emulsion, or a polyethylene/Teflon™ blend.

The coating composition of the present invention may be prepared by conventional methods. For example, the coating composition may be prepared by adding the epoxy resin to a solution of the carboxy addition polymer in a solvent mixture which includes an alcohol and a small amount of water. During the addition, an inert gas blanket is maintained in the reactor and the solution of the carboxy addition polymer is warmed, typically to about 100° C. The mixture is maintained at that temperature and stirred until the epoxy resin is dissolved. The tertiary amine (e.g., dimethylethanol amine) is then added and the resulting mixture stirred for a period of time at elevated temperature. The curing agent, which typically includes a phenoplast resin, is then added and the batch is held for roughly 30 minutes at a temperature of about 90 to 100° C. Deionized water is added under maximum agitation to emulsify the resin and the temperature is allowed to drop. Additional deionized water is typically added at a uniform rate over a period of about one hour while the batch is cooling. The final viscosity is adjusted to the desired value (typically 30–60 seconds (#4 Ford cup at 80° F.) by further addition of deionized water. The coating composition that is produced may be used as is or other additives (e.g., a lubricant) may be blended in to form the final coating composition.

The present invention also provides a method of coating a metal substrate to provide a substantially continuous film on at least one surface of the substrate. The method includes applying the above described aqueous coating composition onto the metal surface to form a coating layer and heating the coated substrate so that the coating layer cures to form a cured film which adheres to the substrate surface. The cured film has a film weight of at least about 3 mg/in$^2$, preferably at least about 5 mg/in$^2$, and is substantially free of blisters. The present coating compositions are typically used to produce blister free cured films having films weights of about 7 mg/in$^2$ to about 9 mg/in$^2$. The coating composition may be applied to the substrate surface using a variety of well-known techniques. For example, the composition may be roll coated, bar coated or sprayed onto the surface. Where large rolls of thin gauge metal are to be coated, it is advantageous to apply the coating composition via reverse roll coating. Where large metal sheets are to be coated, the coating composition is typically direct roll coated onto the sheets as part of a sheet-bake process. The sheet-bake process is typically used to form a coated metal substrate where a relatively low (e.g., about 3–4 mg/in$^2$), cured film weight is desired. If the coating is applied using a sheet-bake process, the coated metal substrate is typically cured at a temperature of about 180° C. to about 205° C. for about 8 to about 10 minutes. In contrast, when the coating is carried out using a coil-coating process, the coated metal substrate is typically cured by heating for about 2 to about 20 seconds at a temperature of about 230° C. to about 300° C. If the coil-coating process is used to produce material to be fabricated into can ends, the cured film on the coated metal substrate typically has a film weight of at least about 5 mg/in$^2$ and preferably, about 7 to about 9 mg/in$^2$.

The present invention may be further described by reference to the following examples. Parts and percentages, unless otherwise designated, are parts and percentages by weight.

EXAMPLES

Example 1

Carboxy Addition Polymer A

A five liter reactor was fitted with stirrer, condenser, heater, and thermometer with inert gas inlet. An inert gas blanket was introduced to the reactor. n-Butanol (3636 parts) and 403 parts deionized water were charged to the reactor and the solvent mixture was heated under agitation to reflux (95–97° C.). In a separate vessel, a monomer premix was prepared from 1160 parts ethyl acrylate, 1864 parts acrylic acid, 2480 parts styrene and 432 parts 70% benzoyl peroxide. The monomer premix was added to the reactor over four hours while maintaining the temperature at 95–97° C. After the addition was complete, the batch was cooled to 93° C. and held at that temperature for one hour. After the one hour hold period, 31 parts 70% benzoyl peroxide were added and the batch was held for another two hours at 93° C. to ensure complete reaction. The final product had an acid number of 248 and contained 57.9 wt.% nonvolatile components.

Examples 2–7

Carboxy Addition Polymers B-G

Using a similar procedure to that described in Example 1, a solution of a carboxy addition polymer (CAP) in 3636 parts n-butanol and 403 parts deionized water was prepared from ethyl acrylate, styrene and either acrylic acid or methacrylic acid (the parts by weight of the monomers used to prepare each specific CAP are shown in Table I) with 463 parts 70% benzoyl peroxide. The final products were characterized as shown in Table I.

Example 8

Coating Composition 1

A reaction flask was prepared with a stirrer, condenser, heater and thermometer with an inert gas inlet. An inert gas blanket was introduced and 112.6 parts Epon 828 (Shell Chemical; Houston, Tex.), 59.4 parts Bisphenol A, 9.1 parts diethylene glycol monobutyl ether (Butyl Carbitol) and 0.15 parts ethyltriphenylphosphonium iodide were charged to the reactor. The mixture was heated with agitation to 121° C. and allowed to exotherm to 170–180° C. Following the exotherm, the batch was held at 155–160° C. until an epoxy value of 0.050 was attained. Then 16.0 parts diethylene glycol monobutyl ether was added. Then 155.0 parts of the solution of the carboxy addition polymer from Example E was added and the temperature was allowed to drop to 96° C. The batch was stirred to achieve uniformity. After the batch was uniform, dimethylethanol amine (22.0 parts) was added at a uniform rate and the batch was held for thirty minutes at 90–98° C. An exotherm was seen immediately following the amine addition. After the thirty minute hold, 86.0 parts t-butylphenol-formaldehyde resin (average degree of polymerization of 6) was added and the batch was stirred for thirty minutes at 90–98° C. The heat was then turned off and 103 parts deionized water were added at a uniform rate to emulsify the resin. The batch was held for one hour, then 240 parts deionized water were added over one hour at a constant rate. The resulting epoxy/acrylate/phenolic composition contained 4.19 wt.% nonvolatile components.

The epoxy/acrylate/phenolic composition (100 parts) from above was charged to a mixing vessel equipped with an agitator. Deionized water, 7.44 parts, was added under agitation and mixed until uniform. The resulting coating composition had a theoretical nonvolatile component of 39.0 wt.%.

Example 9

Coating Composition 2

A 1 liter reaction flask was fitted as described in Example 8 and 247 parts of the carboxy addition polymer prepared in Example E was charged. The resulting mixture was heated with agitation to approximately 100° C. under an inert gas blanket. Epon 1009F epoxy resin (Shell Chemical; Houston, Tex.; 138 parts) was added to the reaction flask and the mixture was stirred at 100° C. until the epoxy resin dissolved. After the batch was uniform, stirring was continued until the batch was 96° C. Dimethylethanol amine (32.0 parts) was then added at a uniform rate and the resulting mixture was stirred for thirty minutes at a temperature of 90–98° C. t-Butylphenol-formaldehyde resin (average degree of polymerization of 6; 68.8 parts) was then added. The batch was held thirty minutes at 90–98° C. and 94 parts deionized water was added under maximum agitation to emulsify the resin. The temperature was allowed to drop to 80–82° C. while the batch was held for sixty minutes. The heat was turned off and deionized water (220 parts) was added at a uniform rate over one hour and the batch was allowed to cool. The resulting epoxy/acrylate/phenolic composition had a nonvolatile content of 43.1 wt.%.

The epoxy/acrylate/phenolic composition (100 parts) was charged to a mixing vessel equipped with an agitator. Deionized water (13.4 parts) was added under agitation and mixed until uniform to produce a coating composition with a theoretical nonvolatile component of 38.0 wt.%.

Examples 10–31

Coating Compositions 3–20

Using a procedure similar to that described in either Examples 8 and 9, coating composition 3–20 were prepared from a t-butylphenol-formaldehyde resin (average degree of polymerization of 6) and the carboxy addition polymers and epoxy resins indicated in Table II.

Two of the epoxy resins used, Epon 1009F and Epon 1007F, were obtained from a commercial source. Epon 1009F (Shell Chemical Company, Houston, Tex.) is an epoxy resin derived from Bisphenol A and epichlorohydrin having an epoxide equivalent weight of about 3000 and an epoxy value of 0.026–0.043. Epon 1007F (Shell Chemical Company, Houston, Tex.) is an epoxy resin derived from Bisphenol A and epichlorohydrin having an epoxide equivalent weight of 1700–2300 and an epoxy value of 0.043–0.059.

The other epoxy resins were obtained by reacting a commercial epoxy resin (Epon 828) with Bis-phenol A. Epon 828 (Shell Chemical Company, Houston, Tex.) is an epoxy resin derived from Bisphenol A and epichlorohydrin having an epoxide equivalent weight of 185–192 and an epoxy value of 0.52–0.54. Epoxy resin H is an epoxy resin having an epoxy value of 0.038 and was obtained by reacting Epon 828 and Bisphenol A (in a weight ration of 64.80/35.20) using the procedure described in Example 8. Epoxy resin M is an epoxy resin having an epoxy value of 0.050 and was obtained by reacting Epon 828 and Bisphenol A (in a weight ration of 65.65/34.35) as described in Example 8. Epoxy resin L is an epoxy resin having an epoxy value of 0.115 and was obtained by reacting Epon 828 and Bisphenol A (in a weight ration of 70.25/29.75) using the procedure described in Example 8.

In each instance, the carboxy addition polymer and epoxy resin were reacted by heating after the addition of dimethylethanol amine catalyst (0.65 equivalent per equivalent of carboxy groups present in the carboxy addition polymer). The t-butylphenol-formaldehyde resin was then added followed by dilution with water as described in Examples 8 and 9 to form an intermediate coating composition. The coating compositions based on either Epon 1009F or Epon 1007F were prepared in a n-butanol/water solvent system according to the procedure described in Example 9. The coating compositions based on either Epoxy Resin H, Epoxy Resin M, or Epoxy Resin L were prepared in a Butyl Carbitol/n-butanol/water solvent system according to the procedure described in Example 8. The wt.% nonvolatile components (solids), viscosity, pH and particle size for each of the intermediate coating compositions are shown in Table III.

The intermediate coating compositions described above were diluted with water (where necessary) to obtain a final coating composition having a viscosity and wt.% solids within the desired ranges (viscosity—about 30 to about 60 seconds (#4 Ford cup at 80° F.); about 30 to about 45 wt.% solids). Using an appropriately sized barcoater, each of coating compositions 1–20 were applied to aluminum metal panels to form a "blister panel." The blister panels were cured by baking for 10 seconds in a 450° F. oven (peak metal temperature of 450° F.) to produce cured coated metal panels having a cured film weight of 7.5 to 8.0 mg/in$^2$. The cured coated metal panels were evaluated for the formation of blisters. The results of these evaluations are summarized in Table II. The results shown in Table II demonstrate that the aqueous coating compositions of the present invention are capable of being applied at high coating weights and cured at high line speeds without blistering to provide a resilient, cured film.

Particle Size Determinations

The measurement of the average particle size of the polymeric dispersions reported in Table III were carried out using a Spectronic 20 Bausch & Lomb 33-39-61-62 spectrophotometer. About one-half to one drop of the coating composition under evaluation was added to 50 ml distilled water. The sample cell of the spectrophotometer was filled from ¼ to ½ full with the resulting solution. The solution was then further diluted by adding distilled water to fill approximately ¾ of the cell. After shaking the cell to produce a homogeneous solution, the percent transmittance of the diluted solution was measured at a wavelength of 375 millimicrons. The concentration of dispersed polymer in the solution was then adjusted so that the solution had an optical density between 0.50 and 0.54 at 375 millimicrons. The optical density of the solution was then measured at 375, 450, 500 and 550 millimicrons. For each solution, log (optical density) was plotted versus log(wavelength) and the average particle size was determined from the slope of the plot, where $$\text{Slope} = \frac{\text{Log}(OD_{375}) - \text{Log}(OD_{550})}{0.167}$$

and

Average Particle Size=Antilog [0.055–0.2615 (Slope)].

Viscosity Measurements

For the purposes of this application, #4 Ford cup viscosity was determined using a slightly modified version of ASTM D-1200-54, which is a procedure used for determining the viscosity of paints, varnishes and related liquid materials. The procedure is carried out with a #4 Ford-type efflux viscosity cup (available from Scientific Instrument Co., Detroit, Mich.). The liquid material (as a solution or dispersion) and the #4 Ford cup are brought to a constant temperature of 80° F. The orifice at the bottom of the viscosity cup is closed and the liquid material to be tested is then poured into the viscosity cup to a slight overflowing of the inner cup. After any excess material is allowed to flow into the outer cup, the orifice at the bottom of the cup is opened. The time interval required for the appearance of the first break in the stream of material flowing from the orifice is measured using a stopwatch. The viscosity is reported as the elapsed time to the appearance of the first break in the stream.

In some instances, viscosity was determined using a Brookfield Model LVF viscometer (Brookfield Engineering Laboratories, Inc.). The Brookfield viscometer measures the torque required to rotate a spindle head immersed in the coating composition at a given angular velocity. The viscosity is reported in units of centipoises.

RESISTANCE TO BLISTERING

The coating composition to be evaluated (100–150 g.) was placed in a 9 oz. jar and agitated for 20 seconds with a plastic prop attached to a high speed motor. The coating composition was then bar coated onto an aluminum panel to form a "blister panel" having a 7.5–8.0 mg/in$^2$ thick coating. A "blister panel" is only coated in the middle of the panel. This enables more heat to be applied to the coating and increases the severity of the blister test.

The coated blister panel is air dried for 5 seconds and then immediately placed in a coil coating oven with a peak metal temperature of 10 seconds at 450° F. After removal from the oven, the cured coated panel in water quenched and visually inspected for blisters. The resistance of the coating to blistering is rated on a pass/fail scale.

Example 32

Coating Composition 25

An inert gas blanket was introduced to a reaction flask fitted with a stirrer, condenser, heater, thermometer and a gas inlet. The flask was charged with 572.4 parts of coating composition 6 (described in Example 13) and agitation was started. Deionized water (159.8 parts) was added and the resulting mixture was stirred until uniform. Styrene (25.6 parts) and butyl acrylate (25.6 parts) were then added and the inert gas blanket was converted to an inert gas sparge. The mixture was heated to 75° C. and the gas sparge was converted back into an inert gas blanket. Benzoin (0.51 parts) was added and the mixture was heated. When the temperature of the mixture reached 80° C., a 30% hydrogen peroxide solution (2.56 parts) was added and the resulting mixture was maintained at 83–86° C. for 2 hours. Additional portions of styrene (12.8 parts) and benzoin (0.13 parts) were then added and the batch was stirred for 5 minutes. Another portion of 30% hydrogen peroxide solution (0.64 parts) was added and the reaction mixture was maintained at 83–86° C. for another 4 hours. The resulting coating composition included the t-butylphenol-formaldehyde resin, the reaction product formed from epoxy resin H and carboxy addition polymer A (as described in Example 13), and a styrene/butyl acrylate hydrophobic addition polymer. The styrene/butyl acrylate hydrophobic addition polymer had a calculated $T_g$ of 3° C.

Example 33

Carboxy Addition Polymer H

Acrylic acid (2542 parts), styrene (748 parts) and ethyl acrylate (2208 parts) were reacted according to the procedure described for the preparation of carboxy addition polymers B-G in Example 2–7. The resulting carboxy addition polymer ("H") had an acid number of 339 and a solids content of 57.0 wt.%.

Example 34

Coating Composition 26

An inert gas blanket was introduced to a reaction flask fitted with a stirrer, condenser, heater, thermometer and a gas inlet. The flask was then charged with 498.1 parts Epon 828 (Shell Chemical; Houston, Tex.), Bisphenol A (268.1 parts), Butyl Carbitol (57.4 parts) and ethyltriphenylphosphonium iodide (0.65 parts). The mixture was heated with agitation to 130° C. and allowed to exotherm to 170–180° C. Following the exotherm, the batch was held at 155–160° C. until an epoxy value of 0.041 was attained. The temperature was allowed to drop to 145–150° C. and diethylene glycol monobutyl ether (57.3 parts) was added followed by adipic acid (8.8 parts) and tri-n-butyl amine (0.5 parts). The reaction mixture was then maintained at 145–150° C. until an epoxy value of 0.025 was attained. The temperature of the reaction mixture was then allowed to drop to about 135° C. while diethylene glycol monobutyl ether (177.2 parts) was added.

A solution of carboxy addition polymer H (175.4 parts) prepared according to the procedure described in Example No. 33 was added. The resulting mixture was stirred at 102° C. until the batch was uniform. After the batch had become uniform, dimethylethanolamine (27.0 parts) was added at a uniform rate over a period of 7 minutes. The resulting mixture was maintained at 95–100° C. for 30 minutes. A mixture of bisphenol A-formaldehyde resin (average degree of polymerization of about 2) was added and the resulting mixture was stirred until all of the solids had dissolved. Deionized water (1067 parts) was then added over 2 hours and the resulting coating composition was allowed to cool to room temperature.

The invention has been described with reference to various specific and preferred embodiments and techniques. It should be understood, however, that many variations and modifications may be made while remaining within the spirit and scope of the invention.

TABLE I

CARBOXY ADDITION POLYMERS

| CARBOXY ADDITION POLYMER | A | B | C | D | E | F | G |
|---|---|---|---|---|---|---|---|
| CONSTITUENTS: | | | | | | | |
| Acrylic Acid | 1864 | — | 2189 | 1412 | — | 2401 | — |
| Methacrylic Acid | — | 2109 | — | — | 1814 | — | 2531 |
| Styrene | 2480 | 1130 | 1654 | 3064 | 1429 | 2323 | 2225 |
| Ethyl Acrylate | 1160 | 2259 | 1654 | 1022 | 2254 | 774 | 742 |
| PROPERTIES: | | | | | | | |
| $T_g$* | 67.0 | 57.5 | 54.2 | 70.4 | 54.8 | 78.4 | 107.6 |
| Solids (wt. %) | 57.9 | 55.4 | 57.4 | 57.3 | 55.6 | 57.9 | 55.4 |
| Acid Number | 248 | 255 | 294 | 195 | 225 | 326 | 305 |
| $M_w$ | 11,680 | 12,660 | 10,670 | 13,840 | 13,360 | 9,960 | 13,080 |
| $M_N$ | 3,380 | 3,570 | 2,940 | 4,220 | 3,860 | 2,860 | 3,930 |
| $M_w/M_N$ | 3.46 | 3.55 | 3.62 | 3.28 | 3.46 | 3.48 | 3.33 |

*Theoretical $T_g$ calculated based on the amount of each monomer in the terpolymer according to the formula:

$$\frac{1}{T_g(\text{terpolymer})} = \frac{\text{wt. \% monomer A}}{T_g(\text{homopolymer A})} + \frac{\text{wt. \% monomer B}}{T_g(\text{homopolymer B})} + \frac{\text{wt. \% monomer C}}{T_g(\text{homopolymer C})}$$

where the wt. % of each monomer is based on the total weight of all three monomers in the terpolymer; the $T_g$s are expressed in degrees Kelvin; and $T_g$(homopolymer X) is the $T_g$ of a homopolymer formed from a given monomer "X".

TABLE II

COATING COMPOSITIONS

| COATING COMPOSITION | EPOXY TYPE | EPOXY LEVEL | CAP TYPE | CAP LEVEL | PHENOLIC LEVEL | BLISTERS |
|---|---|---|---|---|---|---|
| 1 | M | 50 | E | 25 | 25 | PASS |
| 2 | 1009/F | 40 | E | 40 | 20 | PASS |
| 3 | 1009/F | 53 | A | 30 | 17 | PASS |
| 4 | 1007/F | 53 | C | 30 | 17 | PASS |
| 5 | 1009/F | 53 | D | 30 | 17 | PASS |
| 6 | H | 60 | A | 20 | 20 | PASS |
| 7 | H | 60 | B | 20 | 20 | PASS |
| 8 | H | 60 | D | 20 | 20 | PASS |
| 9 | M | 60 | A | 20 | 20 | PASS |
| 10 | M | 60 | F | 20 | 20 | PASS |
| 11 | H | 70 | A | 20 | 10 | SLIGHT |
| 12 | H | 70 | D | 20 | 10 | SLIGHT |

TABLE II-continued

COATING COMPOSITIONS

| COATING COMPOSITION | EPOXY TYPE | EPOXY LEVEL | CAP TYPE | CAP LEVEL | PHENOLIC LEVEL | BLISTERS |
|---|---|---|---|---|---|---|
| 13 | H | 75 | A | 20 | 5 | PASS |
| 14 | M | 75 | C | 20 | 5 | FAIL |
| 15 | 1009/F | 50 | D | 40 | 10 | PASS |
| 16 | L | 50 | F | 25 | 25 | PASS |
| 17 | 1007/F | 50 | B | 30 | 20 | PASS |
| 18 | H | 50 | E | 30 | 20 | PASS |
| 19 | H | 40 | F | 15 | 45 | PASS |
| 20 | H | 4C | G | 15 | 45 | PASS |
| 21 | 1009/F | 60 | D | 35 | 5 | SLIGHT |
| 22 | 1007/F | 60 | G | 35 | 5 | FAIL |
| 23 | H | 80 | C | 15 | 5 | PASS |
| 24 | H | 80 | G | 15 | 5 | FAIL |

TABLE III

PHYSICAL CONSTANTS OF INTERMEDIATE COATING COMPOSTIONS

| Intermediate Coating Composition | Solids | Viscosity (cps) | pH | Part Size |
|---|---|---|---|---|
| 1 | 41.9% | 18300 | 7.0 | 0.23 |
| 2 | 43.1% | 8500 | 7.1 | 0.57 |
| 3 | 43.3% | 5560 | 6.8 | 0.27 |
| 4 | 42.9% | 58000 | 6.5 | 0.34 |
| 5 | 43.4% | 6510 | 7.1 | 0.28 |
| 6 | 42.6% | 224 | 7.0 | 0.27 |
| 7 | 43.0% | 96000 | 7.0 | 0.23 |
| 8 | 42.0% | 83 | 7.4 | 0.26 |
| 9 | 43.4% | 9180 | 7.0 | 0.26 |
| 10 | 41.6% | 1300000 | 6.8 | 0.25 |
| 11 | 43.8% | 7520 | 7.0 | 0.18 |
| 12 | 42.3% | 126 | 7.1 | 0.18 |
| 13 | 44.5% | 13700 | 7.0 | 0.19 |
| 14 | 35.5% | 10960 | 6.8 | 0.16 |
| 15 | 42.6% | 1840 | 7.0 | 0.40 |
| 16 | 35.4% | 590000 | 7.0 | 0.25 |
| 17 | 38.6% | 22400 | 7.0 | 0.28 |
| 18 | 41.7% | 3600 | 7.2 | 0.37 |
| 19 | 41.6% | 65 | 6.7 | 0.52 |
| 20 | 41.7% | 565 | 7.4 | 0.32 |
| 21 | 42.9% | 1640 | 7.3 | 0.22 |
| 22 | 30.6% | 8800 | 7.5 | 0.14 |
| 23 | 38.5% | 1848 | 6.8 | 0.17 |
| 24 | 31.7% | 2000 | 7.7 | 0.15 |

TABLE IV

COATING COMPOSITION SOLVENT COMPONENTS AND FINAL SOLIDS

| Coating Composition | Intermediate Coating Composition Water/Organic | Final Coating Composition | | |
|---|---|---|---|---|
| | | Solids (Theoretical) | Water/Organic | Organic Component* |
| 1 | 80.55/19.45 | 39.6 | 82.84/17.16 | BuOH/Buc |
| 2 | 77.46/22.54 | 38.0 | 82.01/17.99 | BuOH |
| 3 | 81.73/18.27 | 40.6 | 84.17/15.83 | BuOH/BuC |
| 4 | 82.68/17.32 | 36.6 | 87.27/12.73 | BuOH/BuC |
| 5 | 80.68/19.32 | 40.0 | 83.30/16.70 | BuOH/BuC |
| 6 | 80.13/19.87 | 42.6 | 80.13/19.87 | BuOH/BuC |
| 7 | 80.21/19.79 | 38.0 | 84.05/15.95 | BuOH/BuC |
| 8 | 79.45/20.55 | 42.0 | 79.45/20.55 | BuOH/BuC |
| 9 | 80.13/19.87 | 40.0 | 82.82/17.18 | BuOH/BuC |
| 10 | 81.98/18.02 | 32.0 | 88.30/11.70 | BuOH/BuC |
| 11 | 80.13/19.87 | 40.0 | 83.11/16.89 | BuOH/BuC |
| 12 | 79.45/20.55 | 42.3 | 79.45/20.55 | BuOH/BuC |
| 13 | 80.13/19.87 | 40.0 | 83.59/16.41 | BuOH/BuC |
| 14 | 85.91/14.09 | 32.0 | 88.01/11.99 | BuOH/BuC |
| 15 | 79.17/20.83 | 40.0 | 81.41/18.59 | BuOH |
| 16 | 87.09/12.91 | 30.0 | 90.02/9.98 | BuOH/BuC |
| 17 | 84.75/15.25 | 32.0 | 88.74/11.26 | BuOH/BuC |
| 18 | 81.30/18.70 | 38.0 | 84.10/15.90 | BuOH/BuC |
| 19 | 80.07/19.93 | 41.6 | 80.07/19.93 | BuOH/BuC |
| 20 | 79.86/20.14 | 40.0 | 81.28/18.72 | BuOH/BuC |
| 21 | 81.36/18.64 | 40.0 | 83.56/16.44 | BuOH/BuC |
| 22 | 88.57/11.43 | 28.0 | 87.98/10.03 | BuOH |
| 23 | 82.89/17.11 | 36.0 | 84.68/15.32 | BuOH/BuC |
| 24 | 86.99/13.01 | 31.7 | 86.99/13.01 | BuOH/BuC |

*BuOH-n-Butanol
BuC-n-Butyl Carbitol

What is claimed is:

1. An aqueous coating composition comprising:
   at least about 30 wt.% of a film forming component, based on the total weight of the coating composition, wherein the film forming component includes:
   A) a product formed by reacting a mixture which includes carboxy addition polymer, epoxy resin, and tertiary amine, wherein the carboxy addition polymer has a theoretical glass transition temperature of no more than about 110° C. and an acid number of at least about 200, and the epoxy resin has an epoxide equivalent weight of about 2,500 to about 8,000 and includes at least some reaction product of dihydric phenol glycidyl polyether and aliphatic diacid; and
   B) phenoplast resin having a melting point of no more than about 100° C.;
   wherein the coating composition has a viscosity of about 30 to about 60 seconds determined by #4 Ford cup at 80° F.

2. The composition of claim 1 wherein the aliphatic diacid includes at least some adipic acid, succinic acid, or a mixture thereof, and wherein the phenoplast resin includes at least some alkylated phenol-formaldehyde resin.

3. The composition of claim 1 further comprising a solvent component which includes water and organic solvent.

4. The composition of claim 3 wherein the organic solvent includes alkanol, monoalkyl glycol, diethylene glycol monoalkyl ether, or a mixture thereof.

5. The composition of claim 1 wherein the phenoplast resin includes at least some alkylated phenol-formaldehyde resin.

6. The composition of claim 1 wherein the carboxy addition polymer has a theoretical glass transition temperature of about 50° C. to about 100° C.

7. The composition of claim 1 wherein the carboxy addition polymer has an acid number of no more than about 350.

8. The composition of claim 1 wherein the carboxy addition polymer has a weight average molecular weight of about 7,000 to about 15,000.

9. The composition of claim 1 wherein the aliphatic diacid includes adipic acid, succinic acid, dimer fatty acid or a mixture thereof.

10. The composition of claim 1 wherein the dihydric phenol glycidyl polyether includes at least some Bisphenol A glycidyl polyether.

11. The composition of claim 10 wherein the epoxy resin includes at least some of a reaction product of Bisphenol A glycidyl polyether and adipic acid.

12. The composition of claim 1 wherein the product is formed by reacting the carboxy addition polymer and the epoxy resin in the presence of about 0.35 to about 1.0 equivalents of the tertiary amine per equivalent of carboxy groups present in the carboxy addition polymer.

13. The composition of claim 1 wherein the tertiary amine includes an amine having at least two methyl groups.

14. The composition of claim 1
further comprising:
a solvent component which includes organic solvent and water;
wherein the carboxy addition polymer includes at least some of copolymer of acrylic acid, styrene and ethyl acrylate;
the epoxy resin includes at least some a reaction product of Bisphenol A glycidyl polyether and adipic acid;
the phenoplast resin includes at least some alkylated phenol-formaldehyde resin; and
the tertiary amine includes at least some dimethylethanolamine.

15. A composite material comprising a metal substrate having at least one surface covered with a cured film, wherein the cured film is formed by a process comprising (i) coating the substrate surface with the aqueous coating composition of claim 1; and (ii) heating the coated substrate surface.

16. A method of coating a metal substrate comprising:
a) applying the aqueous coating composition of claim 1 onto at least one surface of the metal substrate to form a coating layer on the surface; and
b) heating the coating layer to form a cured film adhered to the substrate surface.

17. An aqueous coating composition comprising:
a solvent component which includes water and organic solvent; and
at least about 30 wt.% of a film forming component, based on the total weight of the coating composition, said film forming component including:
A) product formed by reacting carboxy addition polymer and epoxy resin in the presence of about 0.35 to about 1.0 equivalents of tertiary amine per equivalent of carboxy groups present in the carboxy addition polymer, wherein the carboxy addition polymer has an acid number of at least about 200 and a theoretical glass transition temperature of no more than about 110° C., and the epoxy resin has an epoxide equivalent weight of about 2,500 to about 8,000 and includes at least some reaction product of dihydric phenol glycidyl polyether and aliphatic diacid; and
B) phenoplast resin having a melting point of no more than about 100° C. wherein the composition has a viscosity of about 30 to about 60 seconds determined by #4 Ford cup at 80° F.

18. The composition of claim 17 wherein
the film forming component includes at least about 10 wt.% of the carboxy addition polymer, at least about 40 wt.% of the epoxy resin, and at least about 2 wt.% of the phenoplast resin, based on the total weight of the carboxy addition polymer plus the epoxy resin plus the phenoplast resin.

19. The composition of claim 17 wherein the epoxy resin includes at least some of a reaction product of Bisphenol A glycidyl polyether and adipic acid.

20. An aqueous coating composition comprising:
at least about 50 wt.% of a solvent component, based on the total weight of the coating composition, said solvent component including organic solvent and water; and
at least about 30 wt.% of a film forming component, based on the total weight of the coating composition, said film forming component including:
A) carboxy addition polymer having an acid number of at least about 200 and a theoretical glass transition temperature of no more than about 110° C.;
B) epoxy resin having an epoxide equivalent weight of about 2,500 to about 8,000 and including at least some reaction product of dihydric phenol glycidyl polyether and aliphatic diacid; and
C) a curing agent which is a phenoplast resin having a melting point of no more than about 100° C.
wherein the carboxy addition polymer and the epoxy resin have been reacted in the presence of about 0.35 to about 1.0 equivalents of tertiary amine per equivalent of carboxy groups present in the carboxy addition polymer and wherein the composition has a viscosity of about 30 to about 60 seconds determined by #4 Ford cup at 80° F.

* * * * *